No. 884,960. PATENTED APR. 14, 1908.
C. SUITER.
EXCAVATOR.
APPLICATION FILED JUNE 5, 1906.
14 SHEETS—SHEET 2.
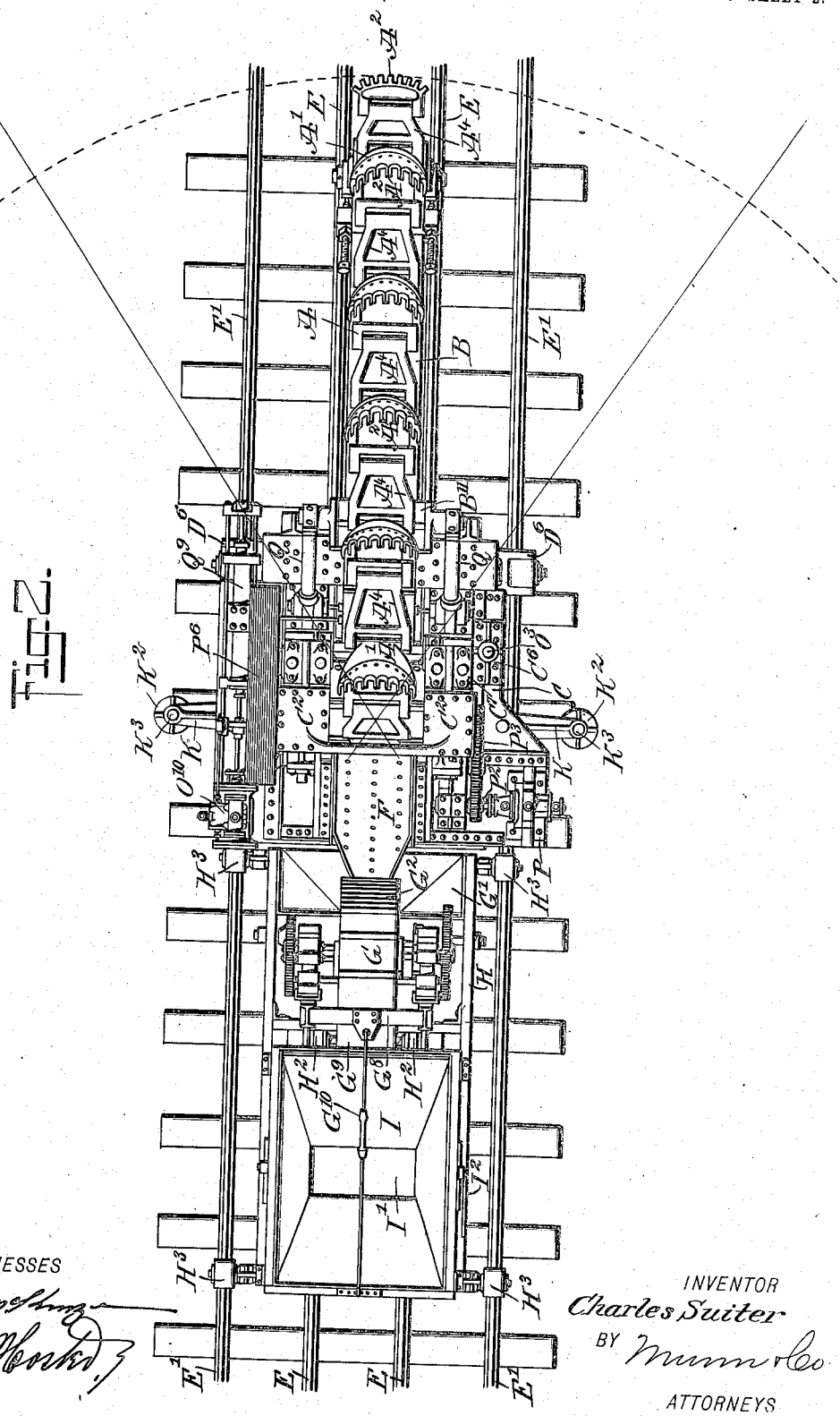
WITNESSES
INVENTOR
Charles Suiter
BY
ATTORNEYS

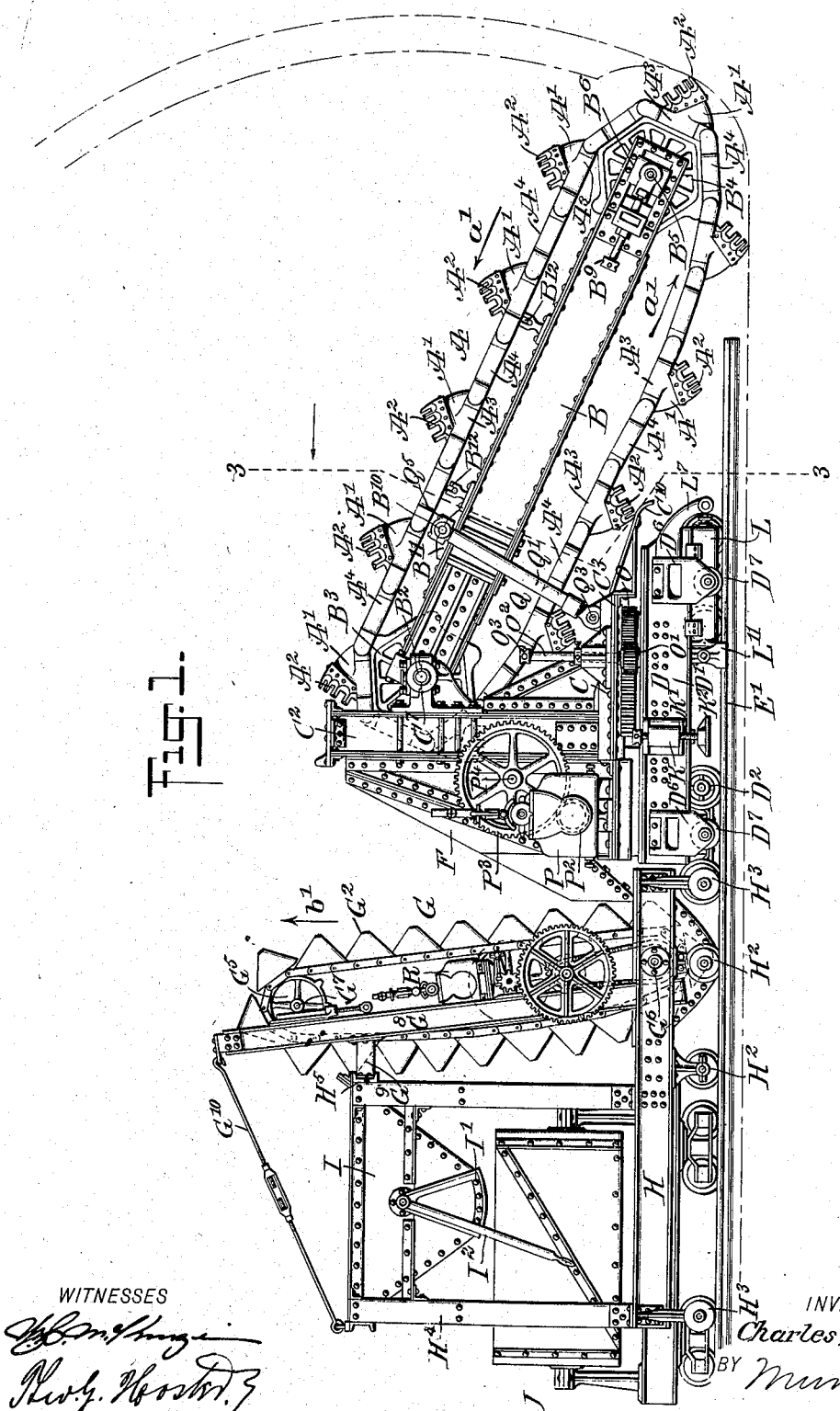

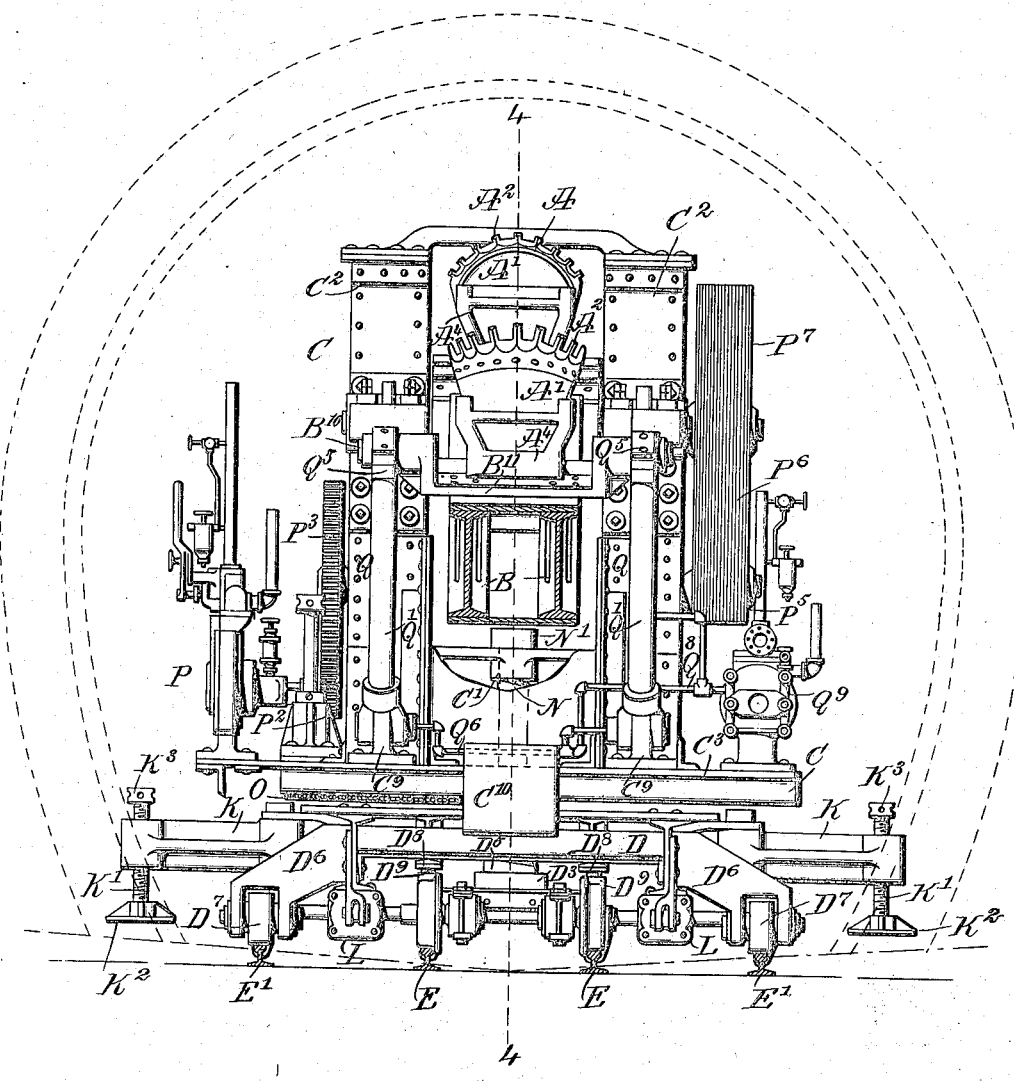

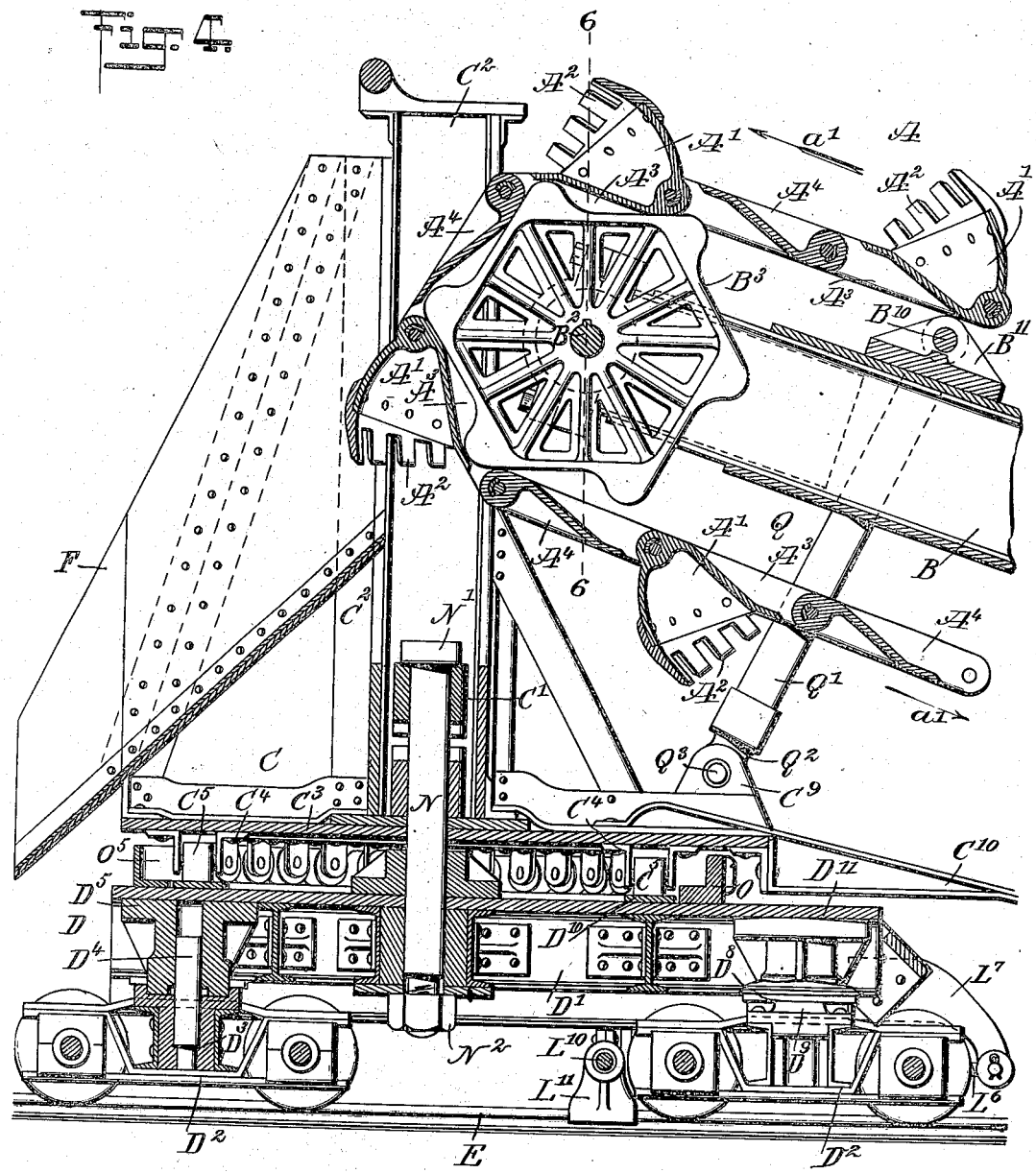

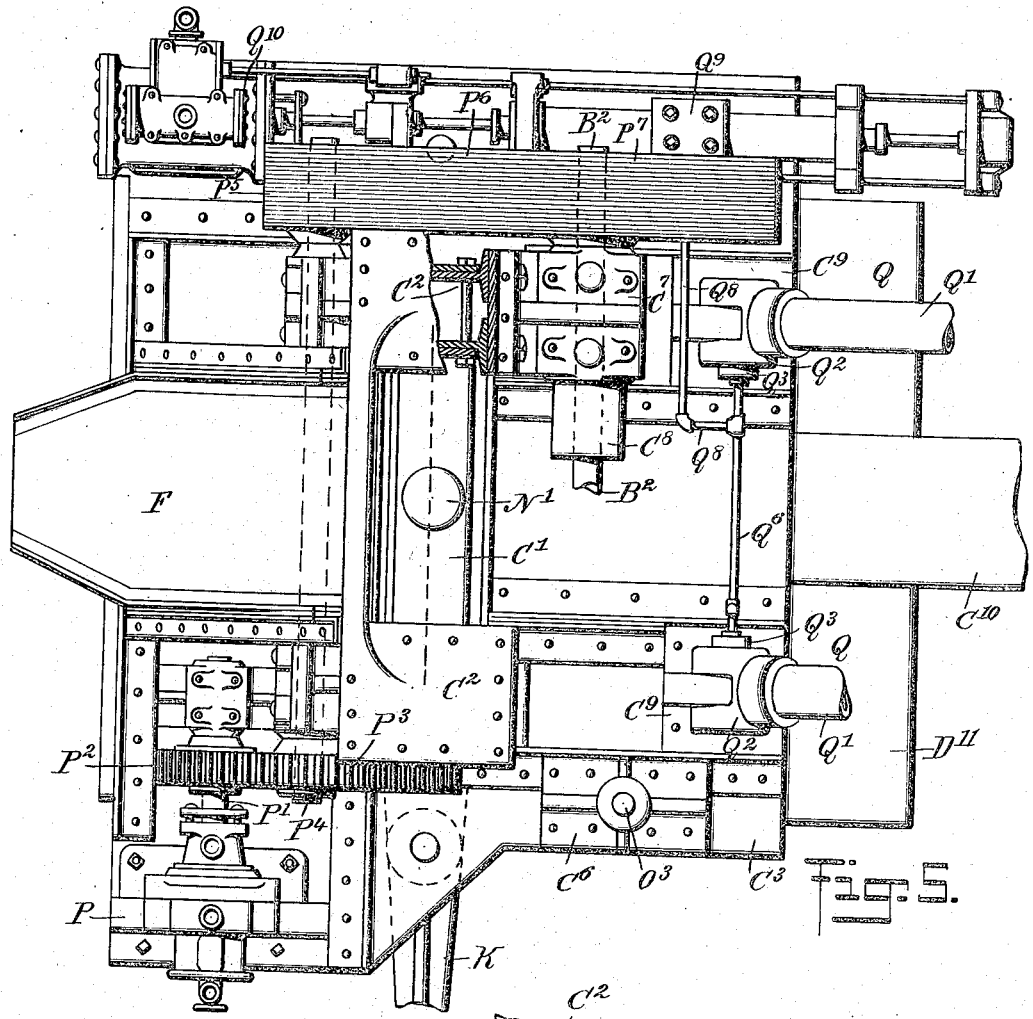
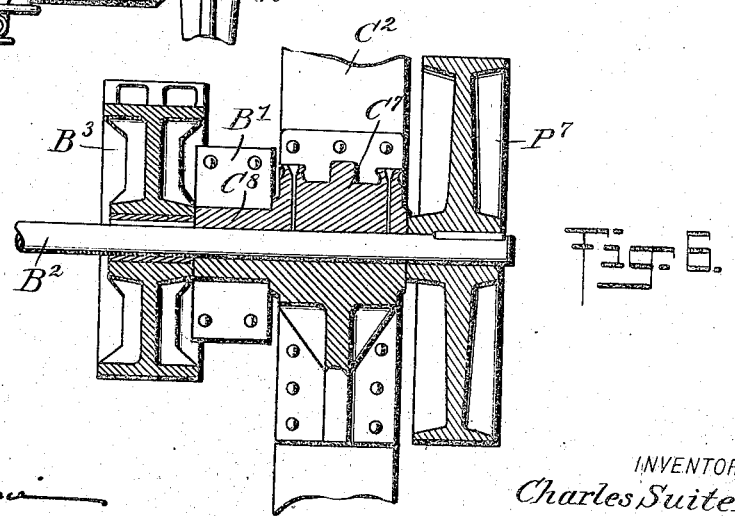

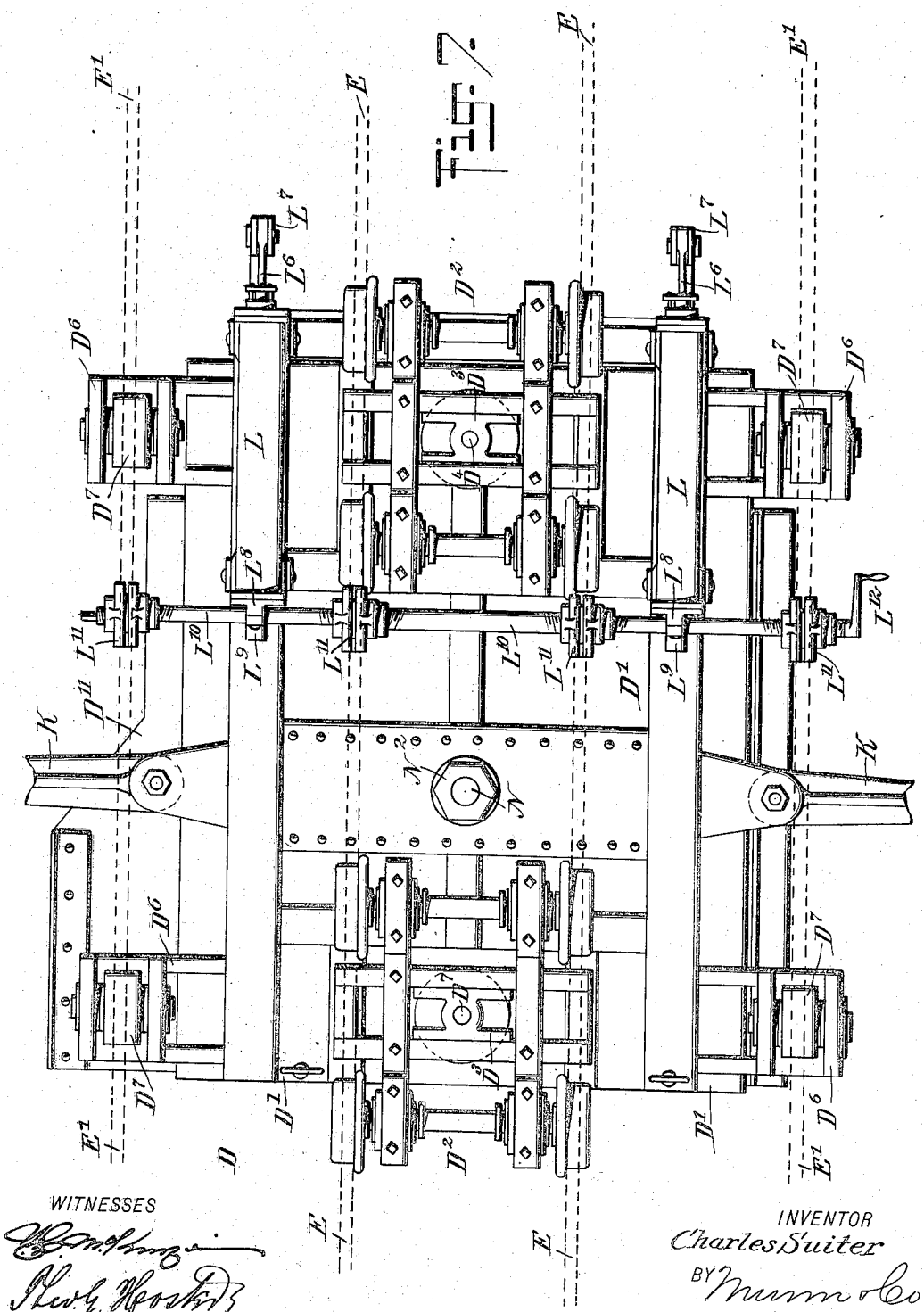

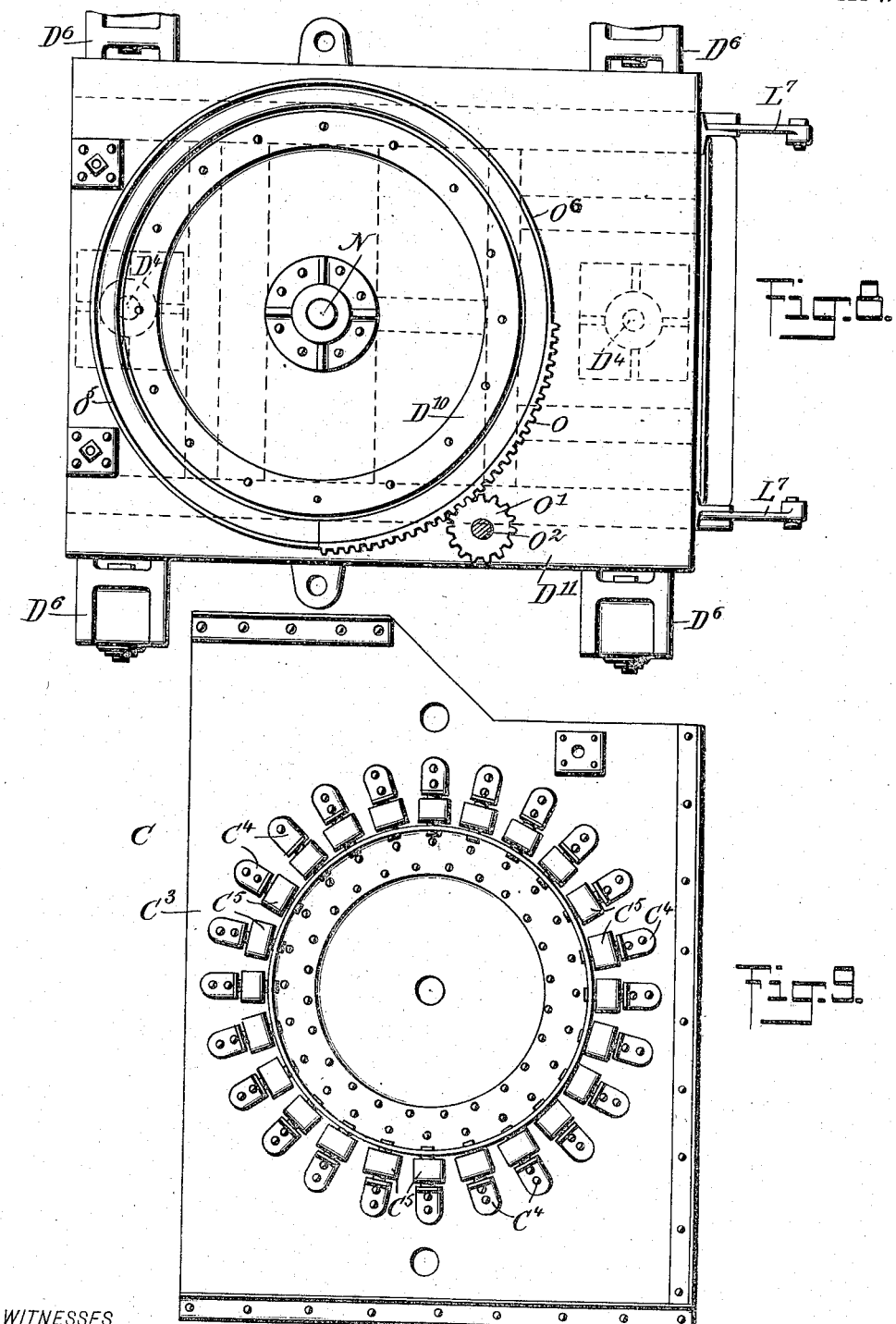

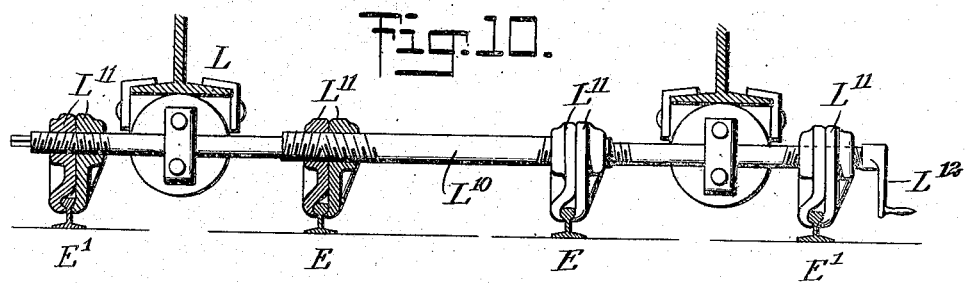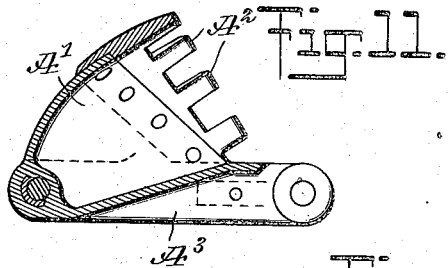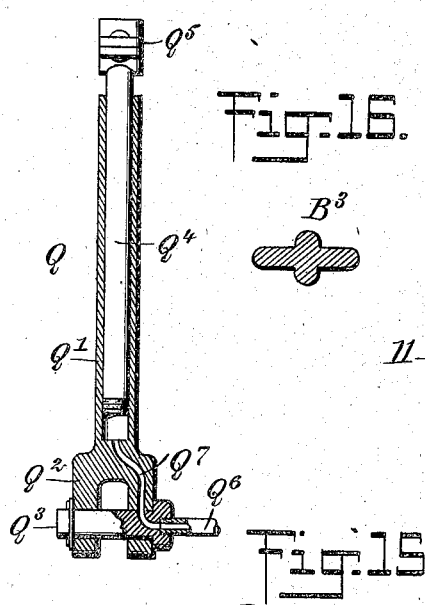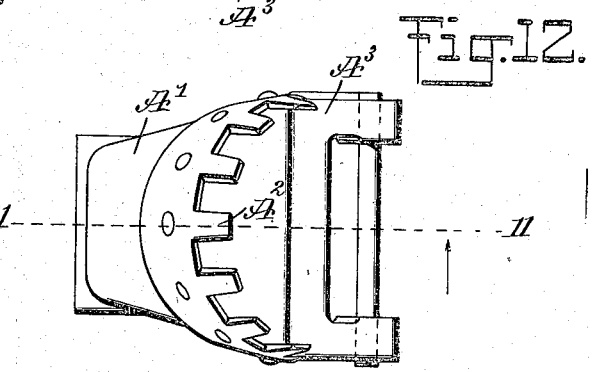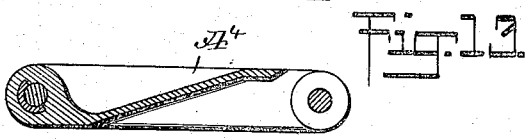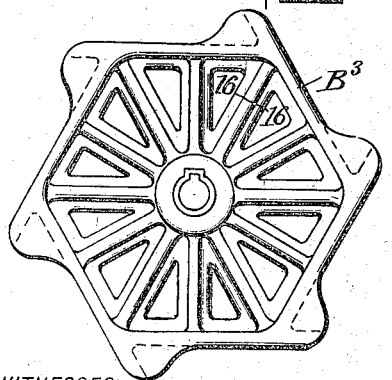

No. 884,960. PATENTED APR. 14, 1908.
C. SUITER.
EXCAVATOR.
APPLICATION FILED JUNE 5, 1906.
14 SHEETS—SHEET 9.
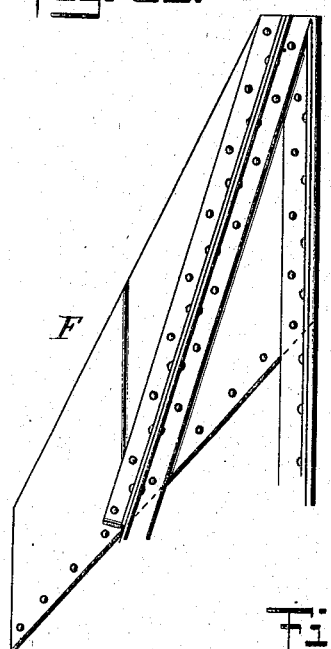
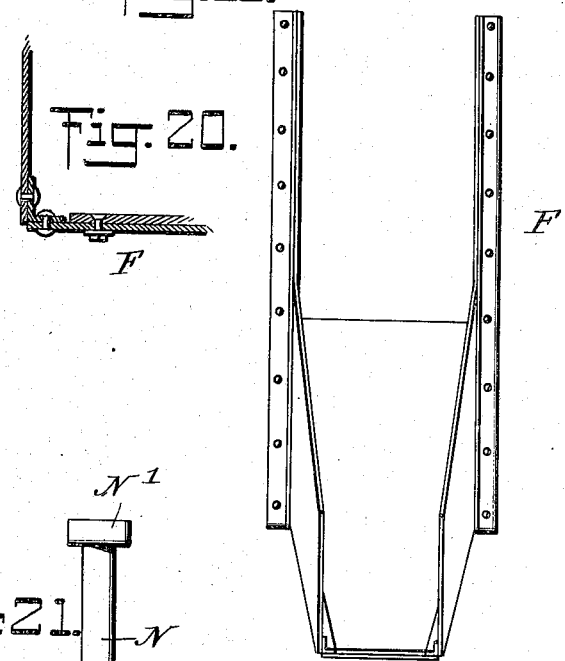
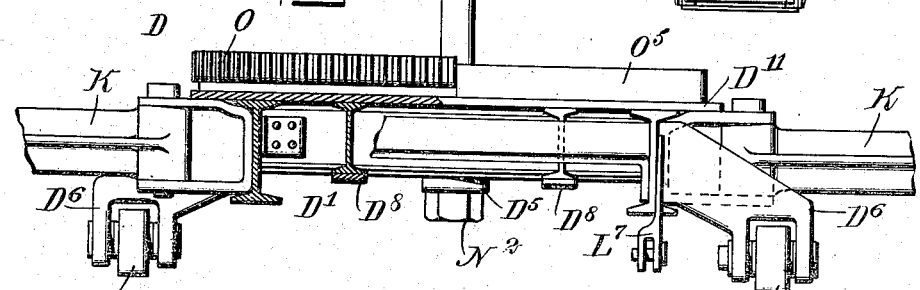
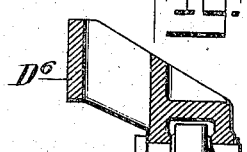
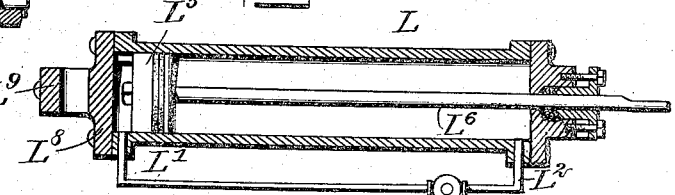
WITNESSES
INVENTOR
Charles Suiter
BY
ATTORNEYS

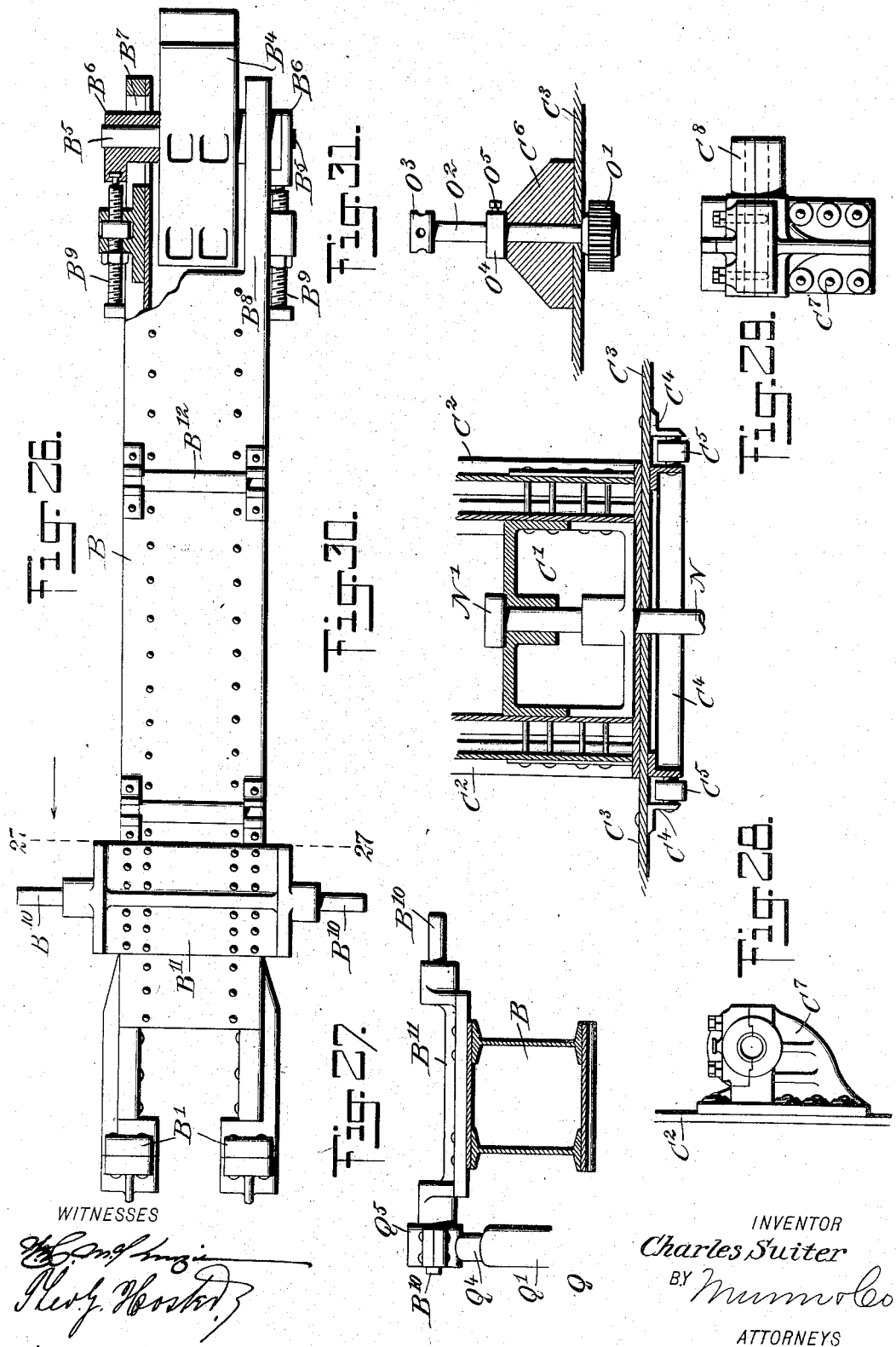

No. 884,960. PATENTED APR. 14, 1908.
C. SUITER.
EXCAVATOR.
APPLICATION FILED JUNE 5, 1906.

14 SHEETS—SHEET 11.

WITNESSES

INVENTOR
Charles Suiter
BY
ATTORNEYS

No. 884,960. PATENTED APR. 14, 1908.
C. SUITER.
EXCAVATOR.
APPLICATION FILED JUNE 5, 1906.
14 SHEETS—SHEET 14.

WITNESSES

INVENTOR
Charles Suiter
BY
ATTORNEYS

UNITED STATES PATENT OFFICE.

CHARLES SUITER, OF BILLINGS, MONTANA.

EXCAVATOR.

No. 884,960.          Specification of Letters Patent.          Patented April 14, 1908.

Application filed June 5, 1906. Serial No. 320,271.

*To all whom it may concern:*

Be it known that I, CHARLES SUITER, a citizen of the United States, and a resident of Billings, in the county of Yellowstone and State of Montana, have invented a new and Improved Excavator, of which the following is a full, clear, and exact description.

The invention relates to the chain and bucket type of excavators, and its object is to provide a new and improved excavator arranged for travel on rails or on the ground to and from the place of excavation, and capable of quick and accurate positioning, to permit of bringing the buckets into the most effective working position, for cutting into a bank of earth, clay, shale, rock or other material to be excavated, or picking up loose material, such, for instance, as is blasted down in mines or tunnels.

A further object of the invention is to quickly dispose of the excavated or picked up material, by delivering it to a storage hopper, from which the material can be periodically discharged into a car running on the tracks at the excavation and serving to carry the material to a suitable place of discharge.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 32:
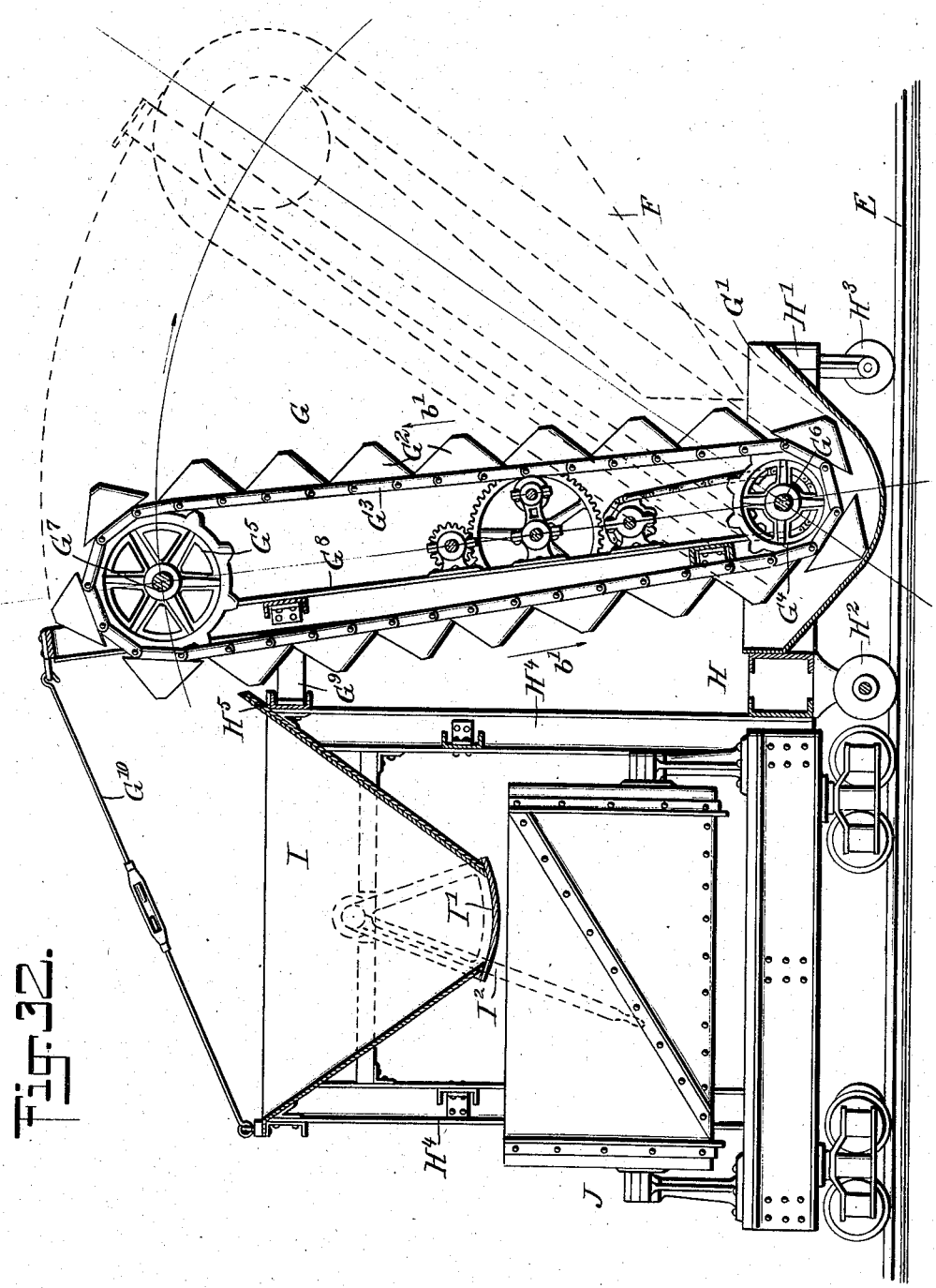
Figure 33:
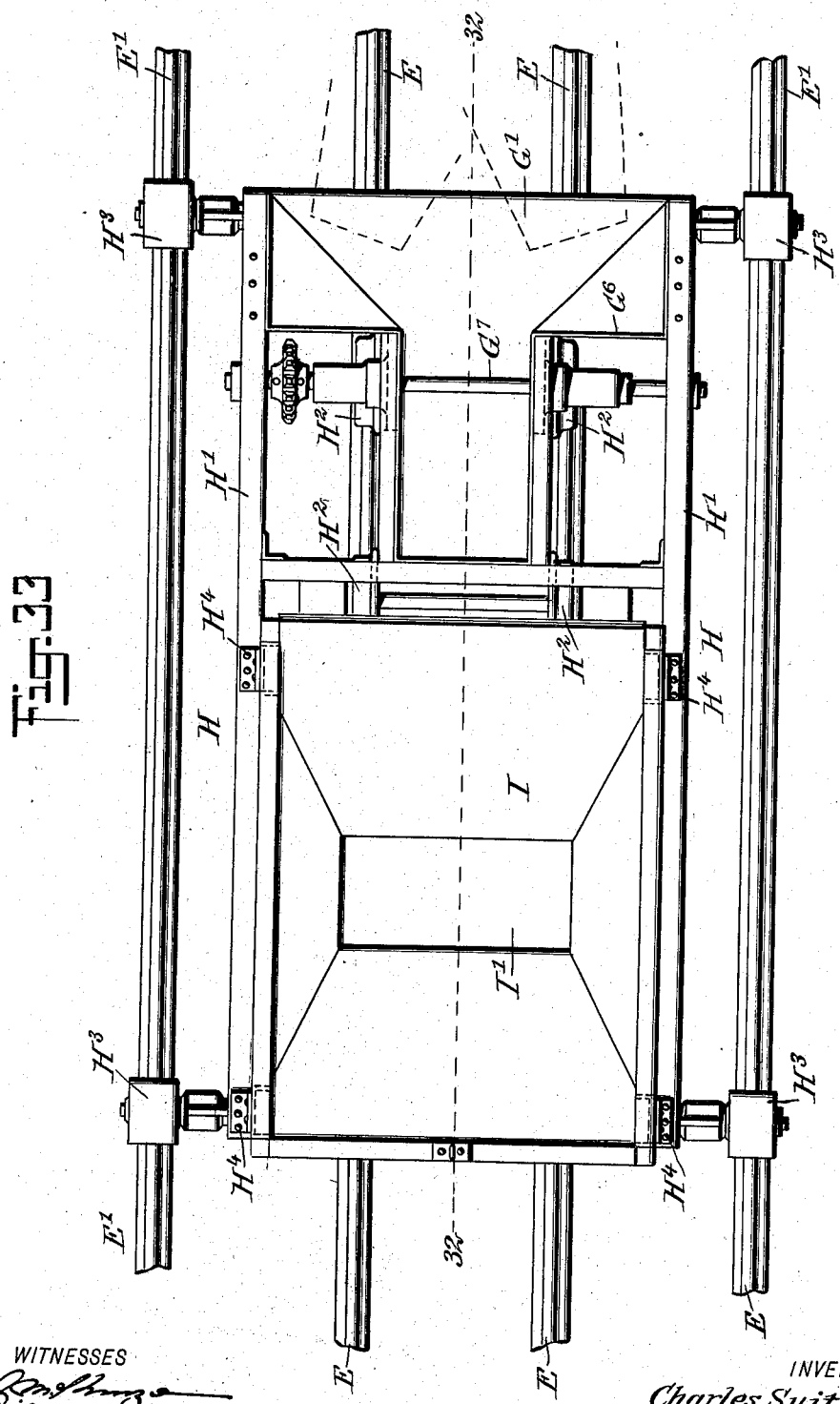
Figure 34:
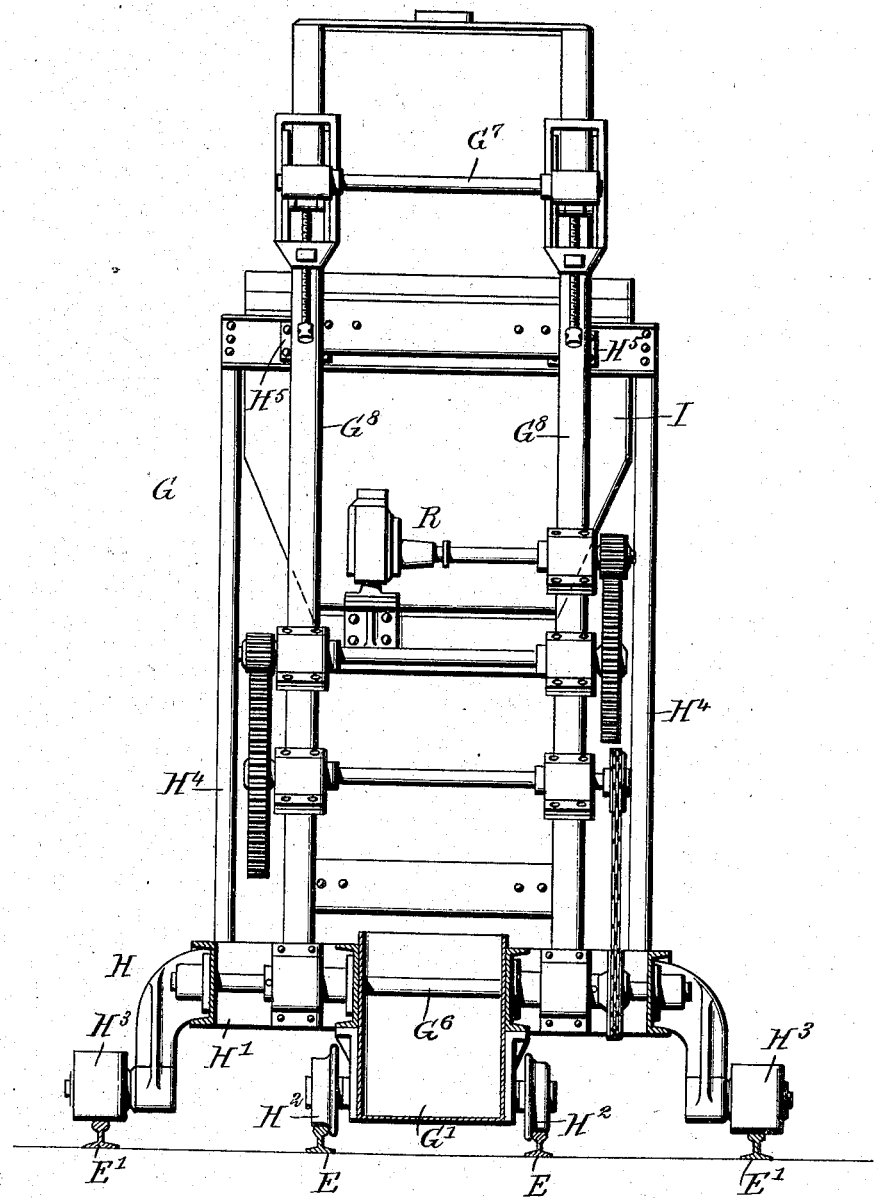
Figure 35:
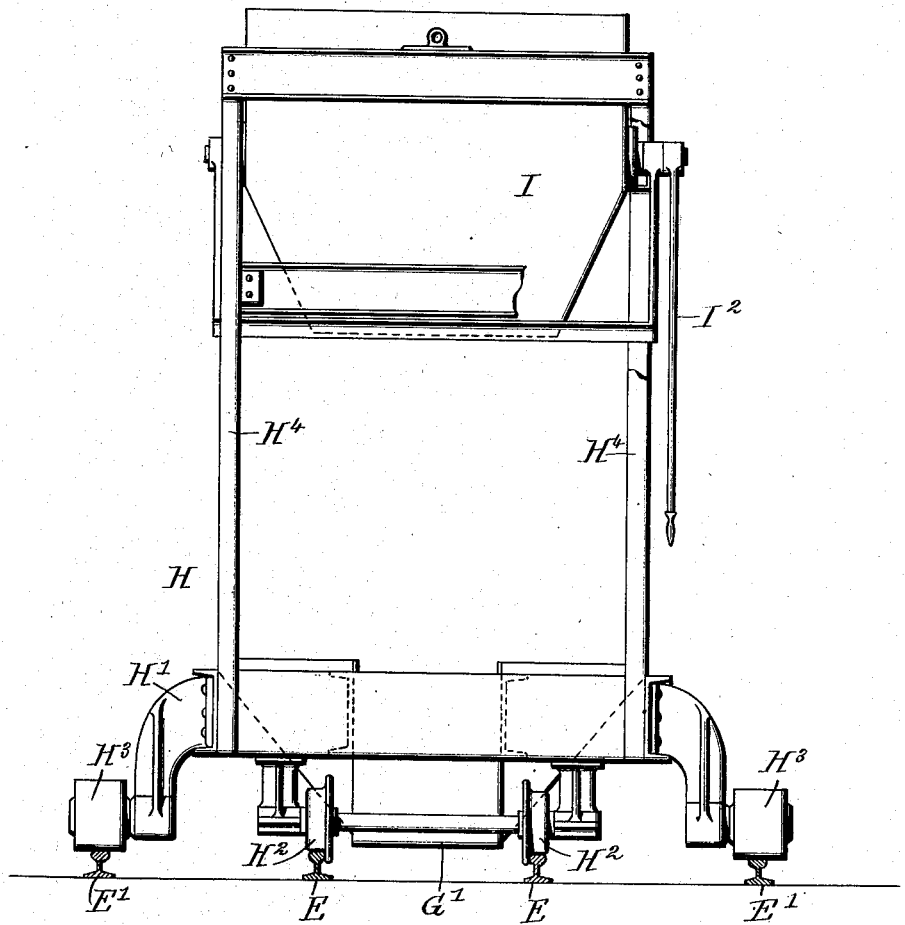

Figure 1 is a side elevation of the improvement; Fig. 2 is a plan view of the same; Fig. 3 is an enlarged cross section of the same on the line 3—3 of Fig. 1; Fig. 4 is an enlarged sectional side elevation of the same on the line 4—4 of Fig. 3; Fig. 5 is an enlarged plan view of the improvement, parts being in section and the chain bucket line being omitted; Fig. 6 is a cross section of the same on the line 6—6 of Fig. 4; Fig. 7 is an inverted plan view of the car on which the excavator is mounted; Fig. 8 is a plan view of the car body, showing more particularly the means for the turntable to travel on and the means for turning the turntable; Fig. 9 is an inverted plan view of the turntable; Fig. 10 is an end view, partly in section, of the means for imparting a forward or backward movement to the excavator; Fig. 11 is an enlarged sectional side elevation of one of the buckets, the section being on the line 11—11 of Fig. 12; Fig. 12 is a plan view of the same; Fig. 13 is a sectional side elevation of one of the links for the chain bucket line, the section being on the line 13—13 of Fig. 14; Fig. 14 is a plan view of the same; Fig. 15 is a side elevation of one of the tumblers or sprocket wheels for the chain bucket line; Fig. 16 is an enlarged cross section of one of the spokes of the said tumblers or sprocket wheels, the section being on the line 16—16 of Fig. 15; Fig. 17 is a transverse section of one of the hydraulic rams for imparting an up and down swinging motion to the supporting arm of the chain bucket line; Fig. 18 is an enlarged side elevation of the chute for delivering the excavated material received from the buckets to the elevator; Fig. 19 is a rear end elevation of the same; Fig. 20 is an enlarged cross section of part of the same; Fig. 21 is a front end elevation of the car body, parts being shown in section; Fig. 22 is a plan view of the bracket and wheel for supporting the car body on auxiliary track rails; Fig. 23 is a transverse section of the same; Fig. 24 is a sectional plan view of one of the pneumatic cylinders employed for imparting a forward and backward movement to the excavator; Fig. 25 is a face view of the rear head of the pneumatic cylinder; Fig. 26 is an enlarged plan view of the swinging arm for the chain bucket line, parts being shown in section; Fig. 27 is a transverse section of the same on the line 27—27 of Fig. 26; Fig. 28 is a side elevation of one of the bearings and trunnion for a driving shaft of the bucket line to turn in and for the swinging arm of the bucket line to swing on; Fig. 29 is a front end view of the same; Fig. 30 is a cross section of the turn-table; Fig. 31 is a side elevation of the pinion and its shaft for turning the turn-table, the bearing of the pinion shaft being shown in section; Fig. 32 is an enlarged sectional side elevation of the elevator; Fig. 33 is a plan view of the same, the buckets being omitted; Fig. 34 is a front end elevation of the same, the buckets being omitted and the receiving receptacle and part of the frame being shown in section, and Fig. 35 is a rear end elevation of the same, parts being broken out.

In the general construction of the excavator an endless bucket line A is mounted to travel on an arm B capable of swinging up and down on a turn-table C mounted on a car D adapted to travel on the ground or preferably on inner and outer track rails E—E, E'—E'. The bucket line A discharges the excavated or picked up material into a chute F supported on the turn-table C, and is discharged rearwardly and downwardly into an elevator G mounted on a car H adapted to travel on the track rails E—E, E'—E' immediately in the rear of the car D. The elevator G discharges the material into a hopper I mounted on the elevator car H and having a manually controlled gate I' for periodically discharging the accumulated material into a transfer or dumping car J traveling on the main track rails E—E and serving to carry the material to the dumping ground or other suitable place of discharge.

The detailed construction of the various devices above mentioned is as follows: The car D consists essentially of a car body D' (see Fig. 4) and front and rear trucks $D^2$ preferably of the four-wheel type and traveling on the inner or main track rails E—E. The trucks $D^2$ are provided with centrally arranged step boxes $D^3$ supporting upwardly extending pins $D^4$ engaging suitable sockets $D^5$ secured to the frame of the car body D', to allow the trucks $D^2$ to readily pass around curves, as the swivel connection shown and described permits turning of the trucks independent of the car body D'.

On the sides of the car body D' are secured outwardly projecting brackets $D^6$ in which are journaled small car wheels $D^7$ mounted to travel on the outer or supplementary track rails E'—E'. The brackets $D^6$ and their wheels $D^7$ are preferably located opposite the middle of the trucks $D^2$, as plainly shown in Fig. 1, and by this arrangement the car body D' besides being supported on the trucks $D^2$ has an additional side support to increase the stability and bearing capacity of the excavator. The sockets $D^5$ rest on the step blocks $D^3$, to support the car body at these points, and the underside of the car body D' is also provided with bearing plates $D^8$ adapted to rest on bearing blocks $D^9$ attached to the tops of the trucks $D^2$ on opposite sides of the step blocks $D^3$ (see Figs. 3 and 4). By the arrangement described the car body is firmly supported on the car trucks $D^2$, thus rendering it almost impossible for the car body D' to tip in any direction, at the same time permitting the car trucks $D^2$ to pivot freely in going around curves.

On each side of the car body D' and preferably at or near the middle thereof is pivoted an arm K in the free end of which screws a vertically disposed jack screw K' having a broad bottom piece $K^2$, adapted to rest on the ground, to form a rigid brace for the car D. The upper end of each jack screw K' is provided with a head $K^3$ having transverse apertures for the insertion of a bar or other tool, to permit the operator to conveniently screw the jack screw K' downward or upward in the corresponding arm K. When the jack screws are not in use they are screwed up and their arms K are swung inwardly, to rest against the side of the car body D', thus forming no obstruction when moving the machine from one place to another.

In order to propel the excavator forward or backward, the following arrangement is made, especial reference being had to Figs. 1, 3, 4, 7, 10, 24 and 25. On the underside of the car body D' and preferably at the forward end thereof and outside of the front truck $D^2$ (see Fig. 7) are mounted to slide longitudinally pressure cylinders L, each connected at its ends by pipes L', $L^2$, $L^3$ and a valve $L^4$ (see Fig. 24) with a suitable source of motive agent supply, such as compressed air or the like. By the use of the valve $L^4$, which may be in the form of a three-way valve, the motive agent can be directed alternately into the opposite ends of the cylinder L, to move the piston $L^5$ therein in the corresponding direction. The piston rod $L^6$ of the cylinder L extends forwardly and pivotally connects at its outer end with a bracket $L^7$ attached to the front end of the car body D'. The rear cylinder head $L^8$ of each cylinder L is provided with a bearing $L^9$ for a transversely extending screw rod $L^{10}$ carrying pairs of clamping members $L^{11}$ (see Figs. 7 and 10) for engagement with the track rails E—E, E'—E'. The screw rod $L^{10}$ is provided with right and left hand threads for engaging the clamping members $L^{11}$, and one outer end of the screw rod $L^{10}$ is provided with a crank arm $L^{12}$, under the control of the operator, for turning the screw rod $L^{10}$, so that the clamping members $L^{11}$ of each pair are moved toward or from each other according to the direction in which the screw rod $L^{10}$ is turned by the operator. Now, when the clamping members are open their lower ends extend on the opposite sides of the rails E—E', and when the clamping members of each pair are moved toward each other then the lower ends engage and clamp the corresponding rail to securely hold the screw rod $L^{10}$ and consequently the cylinders L, against movement in a longitudinal direction. Now when it is desired to move the excavator forward, then the motive agent is admitted by way of the pipes $L^3$, L' and the valve $L^4$ into the rear ends of the cylinders L, so as to push the pistons $L^5$ therein forwardly. Now, as the cylinders L are mounted to slide on the underside of the car body D' and the cylinders are held against movement by the screw rod $L^{10}$ locked in place by the clamping members $L^{11}$ clamped to the rails E—E, E'—E', it is evident that this forward movement of the pistons $L^5$ causes a forward movement of the car D and the parts mounted thereon. The car D is moved a distance corresponding to the length of the stroke of the piston $L^5$, and when it is desired to move the excavator further than this distance, it is necessary for the operator first to turn the screw rod $L^{10}$ in a reverse direction to release the clamping members $L^{11}$ from clamping position, after which the cylinders L are moved forward into their normal positions, and then the clamping members $L^{11}$ are again clamped to the track rails and the above-described operation is repeated; that is, the motive agent is again admitted to the rear ends of the cylinders L, to push the pistons $L^5$ therein forward. It is understood that the cylinders L can be moved forward after the clamping members $L^{11}$ are unclamped, by admitting the motive agent by way of the pipe $L^2$ into the front ends of the cylinders.

When it is desired to move the excavator backward, then the above described operation is reversed; that is, the clamping members $L^{11}$ are locked to the track rails E—E, E'—E' at the time the cylinders L are in rearmost position, and then the motive agent is admitted by way of the pipe $L^2$ into the front ends of the cylinders L, to push the pistons $L^5$ rearward therein, thus moving the excavator in a rearward direction on the rails E—E, E'—E'.

The car body D' is provided with an upwardly extending pivot pin N for the turn-table C to turn on, and the said pin N engages bearings C' held between uprights or standards $C^2$ secured to the base plate $C^3$ of the turn-table C (see Figs. 3, 4, 5 and 30). The head N' of the pin N engages the top of the bearing C', and on the lower threaded end of the pin N screws a nut $N^2$ against the under side of the car body D'. By the arrangement described, the turn-table C is free to turn on the pivot pin N, but is prevented from tipping sidewise or from being lifted off the car body D'. From the under side of the base plate $C^3$ depend bearings $C^4$ for rollers $C^5$ traveling on a circular track $D^{10}$ secured to the upper surface of a table $D^{11}$ forming the top of the car body D' (see Figs. 3 and 4).
By the arrangement described the weight of the turn-table C is transmitted by the rollers $C^5$ to the track $D^{10}$ and hence to the car body, and consequently the pivot N is relieved of undue strain and a free and easy turning of the turn-table C is had on the car body D'.

In order to turn the turn-table C by hand power, the following arrangement is made: On the top of the table $D^{11}$ is secured a horizontally disposed segmental gear wheel O in mesh with a pinion O' secured on the lower end of a shaft $O^2$ journaled in suitable bearings $C^6$ (see Fig. 31) arranged on the base plate $C^3$ of the turn-table C. The upper end of the shaft $O^2$ is provided with a head $O^3$ having transverse apertures for the insertion of a rod or other tool, to permit the operator to conveniently turn the shaft $O^2$ and pinion O' to turn the turn-table C on the car body D', it being understood that as the segmental gear wheel O is stationary the pinion O' rolls over on the said gear wheel O, thus turning the turn-table C to the right or left, according to the direction in which the shaft $O^2$ is turned.

A collar $O^4$ is secured on the shaft $O^2$ by a set screw $O^5$ (see Fig. 31), to hold the shaft $O^2$ in proper position in its bearings $C^6$. The segmental gear wheel O has its center coinciding with the axis of the pivot pin N, as plainly shown in Figs. 4 and 8, and the said segmental gear wheel O forms part of a guard ring $O^6$ attached to the table $D^{11}$ and surrounding the track $D^{10}$ and the rollers $C^5$, and which excludes the dirt from the said track $D^{11}$ and the rollers $C^5$.

The construction of the arm B and the bucket line A is as follows, special reference being had to Figs. 1, 2, 3, 4, 5, 6, 17, 26, 27, 28 and 29. Near the upper ends of the standards $C^2$ and at the front thereof are secured bearings $C^7$ provided at their inner opposite faces with integral transverse hollow trunnions $C^8$, for the members of the rear forked end B' of the arm B to swing on as a fulcrum. In the bearings $C^7$ and trunnions $C^8$ is journaled a transverse shaft $B^2$, carrying a sprocket wheel or tumbler $B^3$ extending between the members of the forked end B' of the beam B. Over the sprocket wheel $B^3$ passes the endless bucket line A, also passing over a sprocket wheel or tumbler $B^4$, having its shaft $B^5$ journaled in suitable bearings $B^6$ mounted to slide lengthwise in suitable guideways $B^7$ formed on the outer forked end $B^8$ of the arm B. Screws $B^9$ serve to adjust the bearings $B^7$ to give the desired tension to the bucket line A. Now, in order to impart a traveling motion to the bucket line A in the direction of the arrow $a'$, a suitable engine or other motor P is provided, mounted on the base plate $C^3$ of the turn-table C, and on the shaft P' of this motor P is secured a pinion $P^2$ in mesh with a gear wheel $P^3$ secured on a transversely extending shaft $P^4$ journaled in suitable bearings arranged on the standard $C^2$. On the shaft $P^4$ is secured a pulley $P^5$, over which passes an endless band $P^6$ also passing over a pulley $P^7$ secured on the shaft $B^2$, so that when the motor P is running a rotary motion is transmitted by the gearing described to the said shaft $B^2$ to rotate the tumbler $B^3$, which then imparts a traveling motion to the bucket line A in the direction of the arrow $a'$.

In order to impart an up and down swinging motion to the arm B carrying the bucket line A, suitable hydraulic rams Q are provided, preferably two in number, and located on the turn-table C and connected with the arm B in a manner presently to be described. Each of the hydraulic rams Q is provided with a cylinder Q' having a head $Q^2$ at its lower end, and this head is connected by a pivot $Q^3$ with a bearing $C^9$ attached to the base plate $C^3$ and turn-table C at the front end thereof. In the cylinders Q' are mounted to travel pistons $Q^4$, pivotally connected at their outer ends $Q^5$ with pins or trunnions $B^{10}$, projecting transversely from a cross head $B^{11}$ secured to the beam B near the rear end thereof, as plainly indicated in Figs. 1, 4 and 26. The pivots $Q^5$ (see Figs. 5 and 17) are engaged by the ends of a pipe $Q^6$, connecting with ports $Q^7$ leading to the lower ends of the cylinders Q', and when water or other fluid is forced through the pipe $Q^6$ into the cylinders Q', then the pistons $Q^4$ thereof are caused to slide outward, thus imparting an upward swinging motion to the beam B and the bucket line A carried thereby. The pipe $Q^6$ is connected by a branch pipe $Q^8$ (see Fig. 5) with the cylinder $Q^9$ of a motor-driven pump $Q^{10}$, mounted on the base plate $C^3$ of the turn-table C.
A three-way valve is arranged in the branch pipe $Q^8$ to control the flow of the water or other fluid from the cylinder $Q^9$ to the cylinders Q', for swinging the arm B upward as previously explained, and when the said three-way valve is turned to disconnect the pipe $Q^8$ from the cylinder $Q^9$ and to connect the said pipe $Q^8$ to a discharge or outlet in the three-way valve, then the water is free to flow out of the cylinders Q' by way of the ports $Q^7$, pipes $Q^6$, $Q^8$ and the three-way valve, to allow the pistons $Q^4$ to slide downward in the cylinders Q', thus causing a downward swinging of the arm B and the bucket line A supported thereby. The three-way valve is preferably arranged over a suitable receptacle (not shown), into which flows the discharged water to permit of reusing the latter in the cylinder $Q^9$, by extending the suction pipe thereof into the said receptacle. Thus the water used in the hydraulic rams Q can be readily used over and over again.

The bucket line A consists of a number of buckets A' having their open arched end provided with teeth $A^2$ for readily cutting into the material to be excavated, and each bucket A' is provided with a link portion $A^3$ connected at each end with plain links $A^4$, which, in turn, are again connected with the link portions $A^3$ of the next following buckets A'. Those buckets and plain links alternate throughout the length of the bucket line. Now, the sprocket wheels or tumblers $B^3$ and $B^4$ are made polygonal, for instance, hexagonal as shown, each side corresponding to the length of the link $A^4$ or the link portion $A^3$ of the bucket A'. On the front end of the base plate $C^3$ of the turn-table C is arranged a downwardly and forwardly extending guard $C^{10}$ for the buckets A' to travel over at the time the arm B is in a lowermost position, so as to prevent injury to the traveling buckets A' as well as to the turn-table C and the car D. Supporting rollers $B^{12}$ are journaled on the upper surface of the arm B to properly support and guide the upper run of the bucket line A, to prevent sagging thereof.

The operation is as follows: When the car D is in the proper position and locked to the rails E—E, E'—E', as previously explained, and the motor P and the pump $Q^{10}$ are in operation, then a continuous traveling motion is given to the bucket line A in the direction of the arrow $a'$, and at the same time an up and down swinging motion is given to the arm B by the operator in charge controlling the motor P and the pump $Q^{10}$ correspondingly. Now, the arrangement is such that each bucket A' in active position at the time the front end of the bucket line A takes up a little less material than its full capacity, and the buckets are placed such distances apart that as one bucket fills and passes out of the material to be excavated the succeeding bucket has not yet begun to dig, and, therefore, on account of the upward swinging motion given to the arm B by the hydraulic rams Q, it is evident that the first bucket is lifted with considerable force against the under side of the material and at the same time is being carried forward by the travel of the bucket line. As the arm B is raised the active bucket at the time cuts out a channel in the material, and when the bucket has passed out of the material then the arm B is swung back to a lowermost position, and then the operator turns the shaft $O^2$ so as to cause the turn-table C to swing and with it the arm B and the bucket line A, so that the next following bucket enters the material adjacent to the channel previously made, that is, passes into fresh material to be excavated. By the arrangement described, the material in front of the excavator can be readily dug up and removed to any desired height within range of the machine as well as to a desired width, thus rendering the excavator exceedingly serviceable for excavating tunnels and mines. It will also be noticed that by the arrangement described loose material in the path of the buckets can be readily picked up and carried rearwardly by the buckets. Now, as the filled bucket travels over the sprocket wheel $B^3$ it discharges into the chute F, down which the material travels in a rearward direction to the elevator G.

The elevator G is constructed as follows, special reference being had to Figs. 32 to 35. The elevator car H is provided with a car frame or body H' having sets of wheels $H^2$— $H^2$ and $H^3$—$H^3$, of which the wheels $H^2$ travel on the main track rails E and the wheels $H^3$ travel on the supplementary track rails E'. The frame H' is open or recessed at the rear end to permit of running the dumping car J in the said open end with a view to bring the car directly underneath the hopper I, and hence when the gate I' is opened by the operator manipulating the gate lever $I^2$ then the contents of the hopper I drop into the car J to fill the same. The frame H' is provided at its rear portion with posts $H^4$ for supporting the hopper I. On the front end of the car frame H' is arranged a receiving receptacle or hopper G' into which drops the material from the chute F. The material falling into the receiving receptacle G' is scooped up by the elevator buckets $G^2$ held on endless chains $G^3$ traveling over sprocket wheels $G^4$, $G^5$ secured to shafts $G^6$, $G^7$, of which the shaft $G^6$ is journaled in suitable bearings held on the frame H', and the shaft $G^7$ is journaled in an elevator arm $G^8$ mounted to swing on the shaft $G^6$ as a fulcrum. The arm $G^8$ is provided near its upper end with a rearwardly extending bar $G^9$ resting in a seat $H^5$ attached to the front posts $H^4$ so as to hold the arm $G^8$ in proper position, that is, slightly rearwardly inclined, as plainly indicated in the drawings. A link $G^{10}$ connects the upper end of the arm $G^8$ with the rear end of the top portion of the hopper I, and this link $G^{10}$ can be disconnected from the arm $G^8$, to permit of swinging the latter forwardly and downwardly to the position indicated in dotted lines in Fig. 32, to allow of conveniently running the elevator G in or out of the mine and under bridges or the like. On the arm $G^8$ is mounted a suitable motor R (see Fig. 1) connected by a gearing with the shaft $G^6$, to rotate the same and thus impart a traveling motion to the buckets $G^2$ in the direction of the arrow b'. Now, it is evident that by having the elevator G operating in conjunction with the excavator proper, the latter can be run continuously and the excavated or picked up material is discharged continuously into the receiving receptacle G', from which the material is carried up and discharged into the hopper I in which the material can accumulate until an empty car J is run under the hopper I. The operator then opens the gate I' to fill the car J, after which the gate I' is again closed and the car J is run out to the place of dumping. In the meantime the material accumulates in the hopper I and another empty car is run under the hopper and filled from the latter, as above described; thus a continuous operation can be carried on by the excavator proper without stopping the line of buckets A, thus permitting of excavating a large quantity of material in a comparatively short time.

Having thus described my invention, I claim as new and desire to secure by Letters Patent:

1. An excavator, comprising an excavator car, an endless traveling bucket line on the car, an elevator car in rear of the excavator car, and an elevator on the elevator car and conveying the material delivered by the buckets to the rear of the excavator.

2. An excavator, comprising an excavator car, an endless traveling bucket line mounted on the car to swing up and down and transversely, an elevator car in rear of the excavator car, and an elevator on the car and conveying the material delivered by the buckets to the rear of the excavator.

3. An excavator, comprising an excavator car, an endless traveling bucket line on the car, a chute carried by the car and receiving the material from the buckets, an elevator car in rear of the excavator car, a receptacle carried by the car and into which the chute discharges, and an elevator also carried by the car for elevating the material from the receptacle and delivering it at the rear of the excavator.

4. An excavator, comprising an excavator car, an endless traveling bucket line mounted on the car, an elevator car in rear of the excavator car, an elevator on the excavator car for conveying away the material delivered by the buckets, a hopper into which the elevator discharges, and a carrying-off car adapted to pass under the hopper.

5. An excavator, comprising an excavator car, a turn-table mounted to turn thereon, an endless bucket line having a supporting arm mounted to swing up and down on the said turn-table, a chute fixed on the turn-table and into which discharges the said bucket line, an elevator car following the said excavator car, and an elevator on the said elevator car and receiving the material from the said chute to elevate the material in the rear of the excavator.

6. An excavator, comprising an excavator car, a turn-table mounted to turn thereon, an endless bucket line having a supporting arm mounted to swing up and down on the said turn-table, a chute fixed on the turn-table and into which discharges the said bucket line, an elevator car following the said excavator car, and an elevator on the said elevator car and receiving the material from the said chute to elevate the material in the rear of the excavator, the said elevator having a delivery hopper for discharging the material into a carrying-off car.

7. An excavator, comprising an excavator car, a turn-table mounted to swing thereon, an endless bucket line having a supporting arm mounted to swing up and down on the said turn-table, a chute fixed on the turn-table and into which discharges the said bucket line, an elevator car following the said excavator car, an elevator on the said elevator car and receiving the material from the said chute to elevate the material in the rear of the excavator, a receiving hopper on the said elevator car and into which discharges the said elevator, and a carrying-off car adapted to pass under the said hopper to receive the material therefrom.

8. An excavator, comprising an excavator car, a turn-table mounted to turn thereon, an endless bucket line having a supporting arm mounted to swing up and down on the said turn-table, a chute fixed on the turn-table and into which discharges the said bucket line, an elevator car following the said excavator car, an elevator on the said elevator car, and receiving the material from the said chute to elevate the material in the rear of the excavator, a receiving hopper supported on the said elevator car above a recess at the rear end of the elevator car, the said hopper receiving the material from the said elevator, and a carrying-off car adapted to pass into the said recess and under the said hopper to receive the material therefrom.

9. An excavator, comprising an excavator car, a turn-table mounted to turn thereon, an endless bucket line having a supporting arm mounted to swing up and down on the said turn-table, a chute fixed on the turn-table and into which discharges the said bucket line, an elevator car following the said excavator car, an elevator on the said elevator car and receiving the material from the said chute to elevate the material in the rear of the excavator, a receiving hopper supported on the said elevator car above a recess at the rear end of the elevator car, the said hopper receiving the material from the said elevator, and a carrying-off car adapted to pass into the said recess and under the said hopper to receive the material therefrom, the said hopper having a manually controlled discharge gate for discharging the contents of the said hopper periodically into the said carrying-off car.

10. An excavator, provided with an excavator car having a pair of trucks, and a car body having a swiveled connection with the said trucks and provided with wheels adapted to run on track rails outside the track rails for the said trucks.

11. An excavator having an excavator car, comprising a pair of trucks and a car body having a swiveled connection with the said trucks and provided with a vertically disposed pivot, a turn-table mounted to turn on the said pivot, an endless bucket line mounted on the said turn-table, wheels journaled on the underside of the said turn-table, a circular track on the said car body for the said wheels to travel on, a segmental gear wheel secured to the said car body, a pinion journaled on the said turn-table and in mesh with the said segmental wheel, and a circular guard on the car body outside the said track and wheels.

12. An excavator having an excavator car, comprising a pair of trucks and a car body having a swiveled connection with the said trucks and provided with a vertically disposed pivot, a turn-table mounted to turn on the said pivot, an endless bucket line mounted on the said turn-table, wheels journaled on the underside of the said turn-table, a circular track on the said car body for the said wheels to travel on, a segmental gear wheel secured to the said car body, a pinion journaled on the said turn-table and in mesh with the said segmental wheel, and a circular guard on the car body outside the said track and wheels, the said segmental gear wheel forming a part of the said guard.

13. An excavator having a car mounted to travel on rails, and an operating device for the car comprising two members movable relatively one to the other, one of the members being slidably mounted on the car and the other pivotally connected with said car, means for securing the member slidable on the car to the rails and means for operating the other member.

14. An excavator having a car mounted to travel on rails, and means for operating the car, comprising a member slidably mounted on the car, a second member movably connected with the first member and pivotally connected with the car, means for securing the member slidable on the car to the rails, and means for operating the member pivotally connected to the car.

15. An excavator having a car mounted to travel on rails and operating means for the car, comprising telescoping members one of which is slidably mounted on the car and the other pivotally connected with said car, means for securing the member slidable on the car to the rails, and means for operating the other member.

16. An excavator having a car mounted to travel on rails, and a power device for moving the car, said power device having its body slidably mounted on the car and a movable member thereof pivoted to the car, and means for securing said body to the rails.

17. An excavator, comprising a car mounted to travel on rails, power cylinders mounted to slide on the said car and having pistons, the piston rods of which are connected with a rigid part of the car, and a device for engagement with the track rails of the car and mounted on the said power cylinders.

18. An excavator having a car mounted to travel on track rails, a power cylinder mounted to slide lengthwise on the car and having the piston rod of its piston connected with the said car, and a clamping device mounted on the said cylinder and adapted to be clamped to the said track rails.

19. An excavator having a car mounted to travel on track rails, a power cylinder mounted to slide lengthwise on the car and having the piston rod of its piston connected with the said car, a clamping device mounted on the said cylinder and adapted to be clamped to the said track rails, and manually controlled means for closing and opening the said clamping device.

20. An excavator having a car mounted to travel on track rails, a power cylinder mounted to slide lengthwise on the car and having the piston rod of its piston connected with the said car, and a clamping device comprising a screw rod supported on the said cylinder, and having right and left hand screws, and pairs of clamping members screwing on the said screw rod and adapted to clamp the track rails.

21. An excavator having a car mounted to travel on track rails, a power cylinder mounted to slide lengthwise on the car and having the piston rod of its piston connected with the said car, a clamping device comprising a screw rod supported on the said cylinder, and having right and left hand screws, and pairs of clamping members screwing on the said screw rod and adapted to clamp the track rails, and manually controlled means for turning the said screw rod.

22. An excavator, provided with a car, a turntable having uprights projecting from its upper face, a bucket line having its arm pivoted on the turn table, a bearing between the uprights of the turntable, and a pivot pin having its upper end engaging the said bearing and its lower end a bearing on the car body, the said pivot pin being provided with a head at its upper end and a nut on its lower end.

23. An excavator, provided with a car, a turntable mounted to turn thereon, a bucket line having an arm pivoted on the said turn-table, and an endless bucket chain mounted to travel on the said arm, and hydraulic rams having their cylinders mounted to swing on the said turn-table and their piston rods pivotally connected with the said arm.

24. An excavator, provided with a car, a turn-table mounted to turn thereon, a bucket line having an arm pivoted on the said turn-table and an endless bucket chain mounted to travel on the said arm, hydraulic rams having their cylinders mounted to swing on the said turn-table and their piston rods pivotally connected with the said arm, and a pressure safety device for the said rams and connected with the cylinders by way of their pivots.

25. An excavator, provided with a car, a turn-table mounted to turn thereon, a bucket line having an arm pivoted on the said turn-table and an endless bucket chain mounted to travel on the said arm, hydraulic rams having their cylinders mounted to swing on the said turn-table and their piston rods pivotally connected with the said arm, and a motor mounted on the said turn-table and connected with the said bucket chain to drive the same.

26. An excavator, provided with a car, a turn-table mounted to turn thereon, a bucket line having an arm pivoted on the said turn-table and an endless bucket chain mounted to travel on the said arm, hydraulic rams having their cylinders mounted to swing on the said turn-table and their piston rods pivotally connected with the said arm, and a guard on the front end of the turn-table for the buckets to travel over at the time the bucket line arm is in a lowermost position.

27. An excavator, comprising in combination an excavator proper having an end bucket line and a chute into which the bucket line discharges the excavated or picked up material, an elevator having a receiving receptacle into which the material is discharged from the said chute, an endless bucket chain for elevating the material, and an overhead storage hopper receiving the material from the elevator buckets.

28. An excavator, provided with an excavator, an elevator, and an overhead storage hopper, the said excavator delivering the material to the said elevator and the latter delivering the material to the said storage hopper.

29. An excavator, provided with an elevator, comprising a car having sets of wheels for travel on main and supplementary track rails, a receiving receptacle on one end of the said car, an endless bucket line for raising the material out of the said receptacle, and an overhead storage hopper supported on a frame-work at the rear of the car.

30. An excavator, provided with an elevator, comprising a car having sets of wheels for travel on main and supplementary track rails, a receiving receptacle on one end of the said car, an endless bucket line for raising the material out of the said receptacle, and an overhead storage hopper supported on a frame-work at the rear of the car and above a recess in the rear of the car to permit of running a dumping car into the said recess underneath the hopper.

31. An excavator, provided with an elevator comprising a car, a receiving receptacle thereon, a bucket line having an arm, sprocket wheels at the ends of the said arm, the shaft of one of the lower sprocket wheels being journaled on the car and the said arm being mounted to swing on this shaft as a fulcrum, the shaft of the upper sprocket wheel being journaled on the said arm, and means for holding the arm in a normal raised position.

32. An excavator, provided with an elevator comprising a car, a receiving receptacle thereon, a bucket line having an arm, sprocket wheels at the ends of the said arm, the shaft of one of the lower sprocket wheels being journaled on the car and the said arm being mounted to swing on this shaft as a fulcrum, the shaft of the upper sprocket wheel being journaled on the said arm, and disconnectible means for normally holding the said arm in a normal raised position and when disconnected allowing the arm to swing down.

33. An excavator, provided with an elevator, comprising a car, a receiving receptacle thereon, a bucket line having an arm, sprocket wheels at the ends of the said arm, the shaft of one of the lower sprocket wheels being journaled on the car and the said arm being mounted to swing on this shaft as a fulcrum, the shaft of the upper sprocket wheel being journaled on the said arm, means for holding the arm in a normal raised position, and a motor mounted on the said arm and geared with the said shaft of the lower sprocket wheel.

In testimony whereof I have signed my name to this specification in the presence of two subscribing witnesses.

CHARLES SUITER.

Witnesses:
W. M. JOHNSTON,
J. N. JOHNSTON.